United States Patent [19]

Bartholomew

[11] 3,814,048

[45] June 4, 1974

[54] AUDIBLE INDICATOR FOR USE WITH FISHING ROD

[76] Inventor: James C. Bartholomew, R.R. 1 Box 12, Ft. Pierce, Fla. 33450

[22] Filed: May 21, 1973

[21] Appl. No.: 361,966

[52] U.S. Cl. .................................. 116/67 R, 43/17
[51] Int. Cl. .............................................. G08b 3/00
[58] Field of Search ............ 116/67, 114, 132, 148, 116/167; 43/17, 18, 25; 242/84.53

[56] References Cited
UNITED STATES PATENTS

| | | | |
|---|---|---|---|
| 1,204,856 | 11/1916 | From | 242/84.53 |
| 1,516,484 | 11/1924 | Meszaros | 43/17 |
| 2,601,839 | 7/1952 | Kucewicz | 116/114 |
| 3,058,250 | 10/1962 | Thomas | 43/17 |
| 3,584,408 | 6/1971 | Frick | 43/17 |

FOREIGN PATENTS OR APPLICATIONS

| | | | |
|---|---|---|---|
| 1,003,095 | 9/1965 | Great Britain | 43/17 |

*Primary Examiner*—Louis J. Capozi
*Attorney, Agent, or Firm*—Gust, Irish, Lundy & Welch

[57] ABSTRACT

An audible indicator for use with a fishing rod having a fishing line coupled thereto, the indicator comprising an elongated member and means for movably clamping the member to a fishing rod. A guide element and a bell are coupled to the member at points thereon distal to the clamping means and the fishing line is slidably received through the guide element whereby the bell is caused to ring in response to movement of the fishing line through the guide element.

1 Claim, 2 Drawing Figures

PATENTED JUN 4 1974  3,814,048

AUDIBLE INDICATOR FOR USE WITH FISHING ROD

BACKGROUND OF THE INVENTION

1. Field of the Invention

The present invention relates to an accessory for use with a fishing rod and in particular to an audible indicator which may be affixed to a fishing rod and which is operatively coupled to the fishing line thereof, the indicator providing an audible alarm in response to movement of the fishing line to indicate that a fish has been caught thereon when the fishing rod is left unattended.

2. Description of the Prior Art

In the sport of ice fishing it is common practice for the fisherman to cut several fishing holes through the ice at spaced-apart locations and to place, as by propping or the like, a fishing rod adjacent each of the fishing holes with a fishing line and lure thereof extending downwardly through the hole. Thus placed, the fishing rods are left generally unattended while the fisherman tends to another fishing rod or seeks shelter from the weather and the poles are only periodically checked to determine whether a fish has been caught on any of the lines. As a consequence, it occurs that a fish which has been hooked on one of the lines is able to free itself from the hook or lure before the fisherman returns to find that a fish has in fact been caught. To overcome this problem, various devices have been proposed to provide an alarm or signal indicative that a fish has been caught on an unattended fishing rod and line.

SUMMARY OF THE INVENTION

The present invention is such a device, an audible indicator for use with a fishing rod having a fishing line coupled thereto, the indicator providing an audible signal in response to movement of the fishing line. The indicator comprises an elongated member and means for movably clamping the member to a fishing rod. A guide element and a bell are coupled to the member at points thereon distal to the clamping means. A fishing line is slidably received through the guide element whereby the bell is caused to ring in response to movement of the fishing line.

In a specific embodiment of the invention, the clamping means includes a body of resilient, rubber-like material having a hole extending longitudinally therethrough and an opening extending through the wall such that the body may be forcibly spread apart and placed on a portion of a fishing rod and released to clamp the body thereto. The elongated member is a lever having its fulcrum pivotally coupled to the clamping means, the guide element and the bell being coupled to opposite ends of the member.

It is therefore an object of the invention to provide an audible indicator for use with a fishing rod having a fishing line coupled thereto, the indicator providing an audible indication of movement of the fishing line.

It is another object of the invention to provide such an indicator which includes a lever operatively coupled to the fishing line and a bell coupled to the lever whereby movement of the fishing line causes ringing of the bell.

It is still another object of the invention to provide such an indicator which can be removably clamped to a fishing rod.

Another object of the invention is to provide such an indicator which is simple in construction, reliable in operation, and inexpensive to produce.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
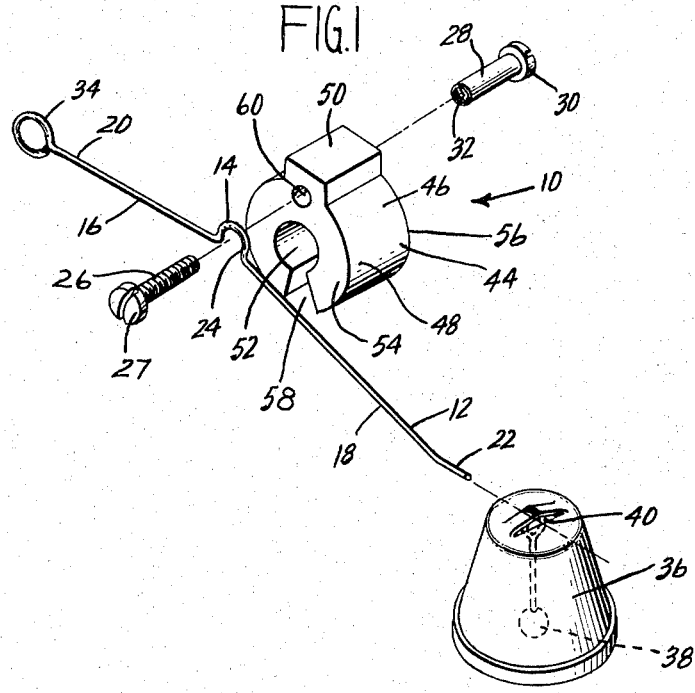
FIG. 1 is an exploded perspective view of the indicator of the present invention.

Referring now to the drawings, there is shown an audible indicator, shown generally at 10 for use with a fishing rod 11 (FIG. 2 only) which comprises an elongated member 12 having a fulcrum 14 and a pair of leg portions 16, 18 which extend downwardly and outwardly from the fulcrum 14 (as viewed in the drawings), and ends 20, 22. Adjacent fulcrum 14, member 12 which may be made of a stiff resilient wire, is formed into an arcuate loop 24 having an arc greater than 180°. The diameter of loop 24 is dimensioned to slidably receive therethrough a conventional threaded fastener 26.

A second threaded fastener 28 having an enlarged head 30 and an internally threaded hole 32 is provided, fastener 28 being adapted to threadingly receive threaded fastener 26 in hole 32.

Adjacent end 20 of member 12 there is formed a guide element 34, essentially a closed loop. End 22 of member 12 is bent upwardly at a small angle as shown. A conventional, small bell 36 having a clacker 38 (shown in dashed lines in FIG. 1) is frictionally, slidably received on end 22 by means of a slot 40 formed in the top of bell 36 as by cutting and bending.

A clamping means 44 is provided for clamping or securing member 12 to fishing rod 11. Clamping member 44 comprises a body 46 of resilient plastic or other rubber-like material. Body 46 is generally annular in shape having an outer surface 48 and being provided with a generally rectangular protrusion 50 at the top (as viewed in the drawings) thereof. A first cylindrical hole 52 is formed through body 46, hole 52 extending between the ends 54, 56 of body 46. An opening 58 is formed through the wall of body 46, opening 58 extending between hole 52 and outer surface 48 the length of hole 52. Opening 58 has a width adjacent outer surface 48 that is about equal to the diameter of fishing rod 11 and a width adjacent hole 52 which is substantially smaller than the diameter of fishing rod 11, whereby body 46 can be forcibly spread apart by forcing same down over fishing rod 11.

In assembly, threaded fastener 26 is slidably received through loop 24 and is received within a second hole 60 formed in protrusion 50 as shown. Hole 60 has its axis disposed in parallel, spaced-apart relationship to the axis of hole 52. Threaded fastener 26 is secured in position by means of threaded fastener 28 thereby positively coupling member 12 to clamping member 44 for pivotal movement about the threaded fastener 26.

Figure 2:
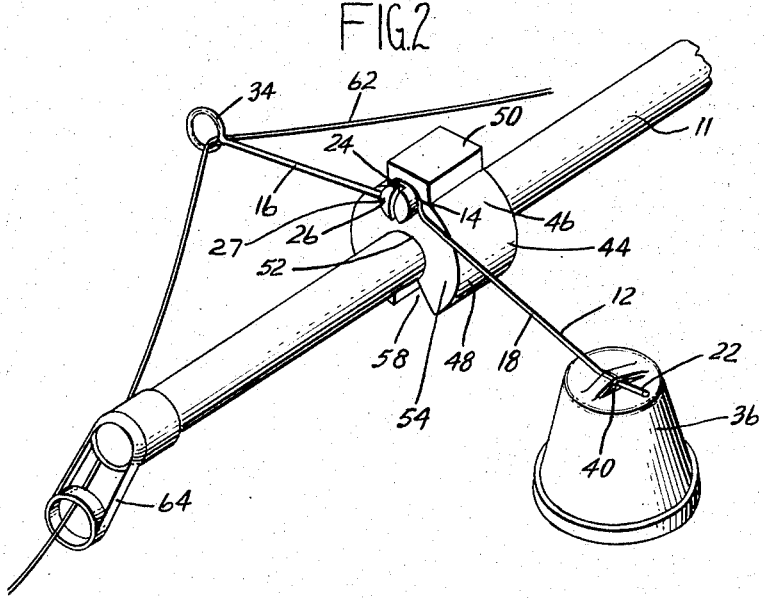
FIG. 2 is a perspective view of the indicator of the present invention shown affixed to a portion of a fishing rod.

Threaded fastener 26 may be provided with a length such that it "bottoms" in threaded hole 32 before the head 27 thereof tightly, frictionally engages fulcrum 14. This allows member 12 to pivot freely about threaded fastener 26. Alternatively, fastener 26 may be dimensioned such that it will firmly engage fulcrum 14. In this case, movement of member 12 is provided by reason of the resiliency of body 46. Bell 36 is fixedly received on end 22 as shown in FIG. 2, and the indicator device 10 is fixedly clamped to fishing rod 11 as shown in FIG. 2. Fishing line 62 associated with fishing rod 11 is threaded through guide element 34 and then outwardly through the conventional line guide 64 affixed to the distal end of rod 11.

In operation, it will be observed that any change in the tension applied to line 62 will produce movement of member 12 and corresponding ringing of bell 36. Correspondingly, a fishing rod 11 provided with the indicator device 10 of the present invention can be placed unattended at a fishing site, i.e., a hole in the ice in the case of ice fishing. If a fish is caught on the lure (not shown) affixed to line 62, this will cause a change in the tension and thereby movement of line 62 and corresponding ringing of bell 36 to thereby alert the fisherman of the catch.

While the present invention has been shown in a specific embodiment, obvious modifications thereof will be apparent to those skilled in the art. For example, both bell 36 and guide element 34 could be affixed to the same leg of member 12, it only being necessary that both the bell 36 and guide element 34 be positioned distally of fulcrum 14.

While there have been described above the principles of this invention in connection with specific apparatus, it is to be clearly understood that this description is made only by way of example and not as a limitation to the scope of the invention.

What is claimed is:

1. An audible indicator for use with a fishing rod having a fishing line coupled thereto comprising an elongated member, means for movably clamping said member to a fishing rod, a bell and a guide element adapted to slidably receive a fishing line therethrough coupled to said member at points thereon distal to said clamping means, said fishing line being adapted to be slidably received through said guide element, whereby, said bell is caused to ring in response to movement of said fishing line, said elongated member being a lever having its fulcrum pivotably coupled to said clamping means, said fulcrum being adjacent the center of said member, said guide element and said bell being coupled to opposite ends of said member, respectively, said body further including a second hole therein having its axis in parallel, spaced-apart relationship to the axis of said first hole and diametrically opposite said opening, a pivot pin fixedly secured in said second hole, said fulcrum including a fulcrum loop in said elongated member having an arc greater than 180°, said fulcrum loop being pivotally received on said pivot pin, the opposite ends of said member extending outwardly and downwardly from said fulcrum when said indicator is in a position for use, said elongated member being made of a stiff, resilient wire, said guide element including a closed guide loop formed integrally at one end of said member.

* * * * *